United States Patent [19]
Tanaka

[11] Patent Number: 5,479,236
[45] Date of Patent: Dec. 26, 1995

[54] IMAGE STABILIZING APPARATUS

[75] Inventor: Hideki Tanaka, Yokohama, Japan

[73] Assignee: Canon Kabushiki Kaisha, Tokyo, Japan

[21] Appl. No.: 313,398

[22] Filed: Sep. 27, 1994

Related U.S. Application Data

[63] Continuation of Ser. No. 117,346, Sep. 7, 1993, abandoned, which is a continuation of Ser. No. 701,051, May 16, 1991, abandoned.

[30] Foreign Application Priority Data

May 16, 1990 [JP] Japan ..................... 2-125698

[51] Int. Cl.$^6$ ..................... G03B 7/08
[52] U.S. Cl. ..................... 354/430; 348/208; 359/557
[58] Field of Search ..................... 354/410, 430, 354/70; 348/208; 359/554, 557, 676, 678, 696, 697, 698, 705, 822, 823

[56] References Cited

U.S. PATENT DOCUMENTS

| 3,944,324 | 3/1976 | Tajima et al. | 359/557 X |
| 5,012,270 | 4/1991 | Sekine et al. | 354/430 |
| 5,040,881 | 8/1991 | Tsuji | 359/557 |
| 5,266,981 | 11/1993 | Hamada et al. | 354/400 |

FOREIGN PATENT DOCUMENTS

| 57-7414 | 2/1982 | Japan. |
| 61-223819 | 10/1986 | Japan. |
| 1-116619 | 5/1989 | Japan. |
| 2-13901 | 1/1990 | Japan. |

*Primary Examiner*—Howard B. Blankenship
*Attorney, Agent, or Firm*—Fitzpatrick, Cella, Harper & Scinto

[57] ABSTRACT

This specification discloses an image stabilizing apparatus of high accuracy which includes a photo-taking lens having a first lens unit movable along the optic axis thereof to vary the focal length thereof, a second lens unit movable along the optic axis thereof to effect focus adjustment, and an optical unit for compensating for the vibration of an image, first and second detectors for detecting the lens positions of the first and second lens units, a third detector for detecting the vibration of the photo-taking lens, and a calculator for calculating the amount of compensation of the optical unit on the basis of the detection signals of the first, second and third detectors and in which the optical unit is operated to thereby ensure a good follow-up property relative to image vibration.

18 Claims, 8 Drawing Sheets

IMAGE STABILIZING APPARATUS

This application is a continuation of application Ser. No. 08/117,346 filed Sep. 7, 1993, now abandoned, which is a continuation of application Ser. No. 07/701,051 filed May 16, 1991, now abandoned.

BACKGROUND OF THE INVENTION

1. Field of the Invention

This invention relates to a photographing apparatus having so-called image blur compensation means having the function of compensating for the image blur of a photographed image caused by the vibration of a camera such as the vibration of a hand, and particularly to a photographing apparatus having image blur compensation means designed to control the amount of compensation of image blur on the basis of the focal length information and focus distance information of a photographing system, and compensate for image blur highly accurately.

2. Related Background Art

Generally, if a camera is vibrated by the vibration of a hand or the like when photographing is being effected with the camera held in hands, image blur will occur in a photographed image to deteriorate the quality of image. For this reason, there have recently been proposed various photographing apparatuses provided with image blur compensation means designed to compensate for image blur caused by the vibration of a camera such as the vibration of a hand.

FIGS. 7 to 9 of the accompanying drawings are schematic views of the essential portions of the optical system of a photographing apparatus having image blur compensation means proposed by the applicant in Japanese patent Laid-Open No. 1-116619. In these figures, the photographing system is constituted by a magnification changing optical system, and some of the lens units of the magnification changing optical system are eccentrically driven to compensate for image blur caused by vibration or the like.

The magnification changing optical system shown in these figures is a so-called two-unit zoom lens which has in succession from the object side a first lens unit 31 of positive refractive power and a second lens unit 32 of negative refractive power and in which the spacing between the two lens units is changed to effect a magnification change and the first lens unit 31 is moved on the optic axis to effect focusing. The reference numeral 33 designates an imaging surface such as an image pickup surface or film, the reference numeral 35 denotes a light beam imaged at a point A on the imaging surface 33, and the reference numeral 34 designates the optic axis of the magnification changing optical system. FIG. 9A shows the optical arrangement of the wide-end, and FIG. 9B shows the optical arrangement of the telephoto-end.

FIG. 7 is a schematic view of the optical system when there is no vibration of the camera and there is no image blur. In FIG. 7, the light beam 35 is imaged at a point A on the imaging surface 33 at the wide-end and the telephoto-end because there is no vibration of the camera and there is no image blur.

FIG. 8 is a schematic view of the optical system when the vibration of the camera is transmitted to the magnification changing optical system to cause the image to be blurred. In FIG. 8, for simplicity, there is shown the imaged state by the blur of the light beam when on the wide-side and the telephoto-side, the entire magnification changing optical system is forwardly inclined about the point A and the blur of the image is caused.

That is, the light beam 35 which should originally be imaged at the point A is imaged at a point B on the imaging surface 33 on the wide-side and at a point C on the imaging surface 33 on the telephoto-side.

Now, when the film is under exposure and the magnification changing optical system is monotonously inclined from the state shown in FIG. 8A to the state shown in FIG. 8B and the blur of the image is caused, the image which should be formed as a point image at the point A if there is no blur is formed as a blurred line image of a segment AB on the wide-side and a blurred line image of a segment AC on the telephoto-side.

FIGS. 9A and 9B are schematic views when compensation is effected for the blur of the image shown in FIG. 8. In FIG. 9, the first lens unit 31 is used as a movable lens unit for image blur compensation and is made parallel-eccentric in a direction orthogonal to the optic axis 34 to compensate for the blur of the image. In these figures, the reference character 34a designates the optic axis of the first lens unit, which is parallel to the optic axis 34 of the first and second lens units which has been a common axis before the compensation of the blur.

As shown in FIG. 9, the first lens group 31 is made parallel-eccentric by a predetermined amount for the blur of the image caused by the forward inclination of the entire magnification changing optical system, whereby the light beam which would be imaged at the point B at the wide-end and at the point C at the telephoto-end as shown in FIG. 8 can be imaged at the point A which is the original imaging point.

Image stabilization is achieved by the first lens unit being thus made parallel-eccentric. In FIGS. 7 to 9, instead of the first lens unit, the second lens unit can be made parallel-eccentric to compensate for the blur of the image in a similar manner.

Generally, the amount of image blur $y_I$ when the camera is inclined by an angle $\theta$ by vibration or the like is $$y_I = f \cdot \theta (1+\beta), \tag{1}$$

where f is the focal length of the photo-taking system and $\beta$ is the then imaging magnification (lateral magnification). When here, the amount of parallel eccentricity of the lens unit for compensating for the amount of image blur is $y_L$, the degree of sensitiveness S as anti-vibration means is $$S = y_I / y_L. \tag{2}$$

As is clear from equations (1) and (2), the degree of sensitiveness S of the anti-vibration means depends on the focal length f and imaging magnification $\beta$, i.e., the focus distance, of the photo-taking system.

In the magnification changing optical system shown in FIG. 7 to FIG. 9B, during focusing, the first lens unit 31 is moved on the optic axis and therefore, the focal length as the entire magnification changing optical system is variously varied by the focus distance. This holds true not only of the two-unit zoom lens shown in these figures, but also of magnification changing optical systems of other types.

Particularly recently, the so-called rear focus system has often been adopted as a focus system to achieve the compactness of the magnification changing optical system, but the adoption of this rear focus system results in the focal length of the entire system being greatly varied by the focus distance.

In a photo-taking system having the conventional image blur compensation means, the degree of senstiveness which is the eccentric movement of a compensation lens unit for image blur compensation has been set by the use of only the value of the focal length of the photo-taking system. Therefore, where use is made of a photo-taking system whose focal length is greatly varied by the focus distance, the degree of sensitiveness of image blur compensation is greatly varied by the focus distance, and this has led to the problem that image blur cannot be compensated for highly accurately. This has held true not only of the magnification changing optical system, but also of photo-taking systems of single focal length. The technique of varying the amount of compensation movement of a compensation lens by the position of a focusing lens is proposed in U.S. application Ser. No. 627,924.

SUMMARY OF THE INVENTION

It is an object of the present invention to provide a photographing apparatus in which the image blur of a zoom lens is compensated for highly accurately.

It is also an object of the present invention to provide a photographing apparatus in which an image is optically stabilized with the focal length information of a zoom lens and focusing lens position information taken into account.

DESCRIPTION OF THE PREFERRED EMBODIMENTS

Figure 1:
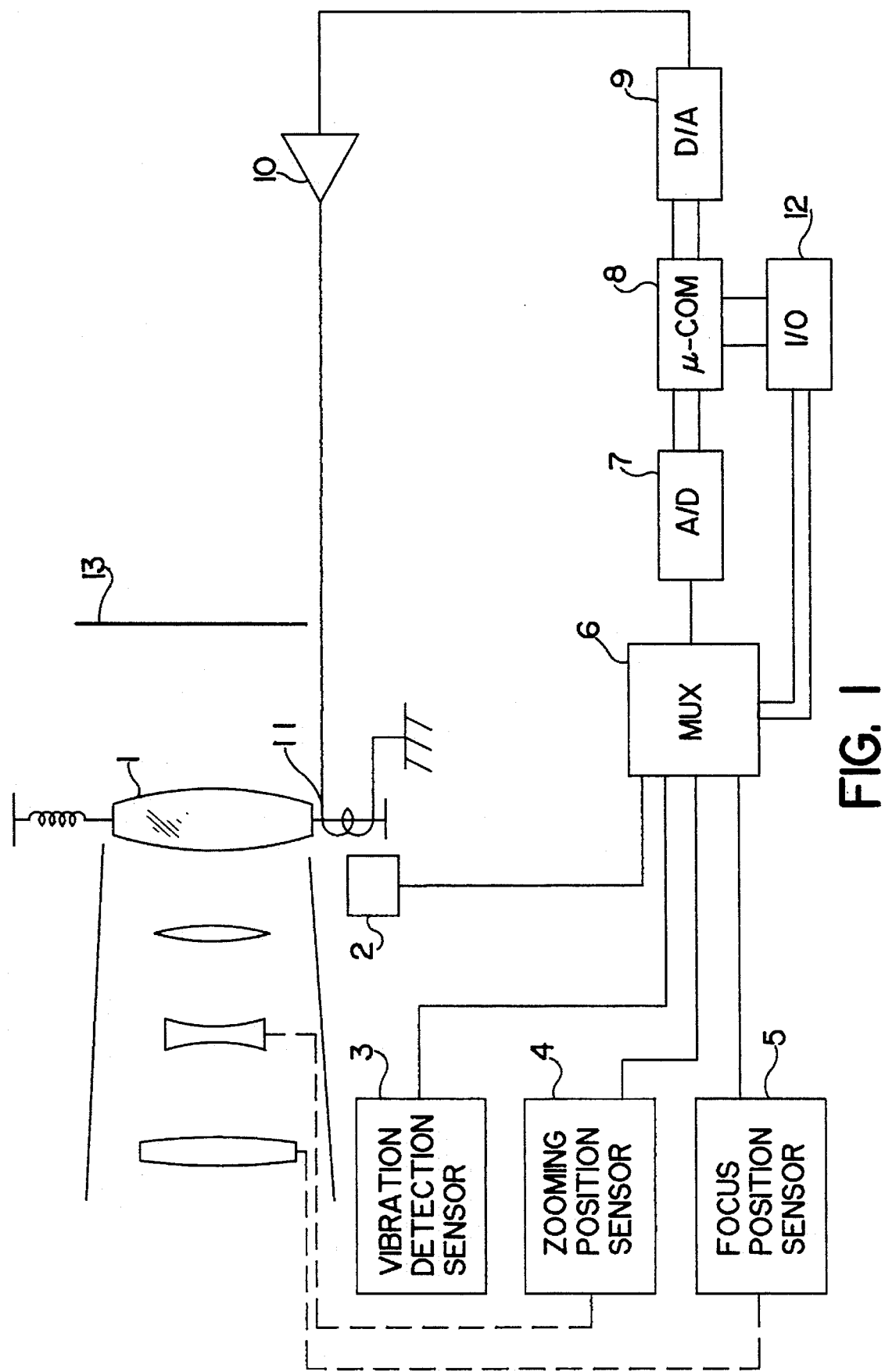
FIGS. 1, 3, 5, 6 and 10 are schematic diagrams of the essential portions of first, second, third, fourth and fifth embodiments, respectively, of the present invention.

FIG. 1 is a block diagram of the essential portions of a first embodiment of the present invention.

In FIG. 1, the reference numeral 1 designates a compensation lens for image blur which forms a part of a phototaking lens (not shown). The compensation lens 1 is driven eccentrically with respect to the optic axis, whereby an image is stabilized. The reference numeral 2 denotes a lens position sensor which detects the amount of compensation movement of the compensation lens 1, i.e., the position of the compensation lens, and outputs an analog signal (an analog voltage). The reference numeral 3 designates vibration detection means for detecting vibration which is provided in a portion of a photo-taking system and detects the vibration (angle) when the photo-taking system is vibrated by the vibration of a hand or the like. The reference numeral 4 denotes a zooming position sensor which, when the photo-taking lens is a zoom lens, outputs an analog signal corresponding to focal length information conforming to the zooming position (focal length). The reference numeral 5 designates a focus position sensor which detects the position of the focusing lens of the photo-taking lens on the optic axis, and outputs an analog signal corresponding to focus distance information.

The reference numeral 6 denotes a multiplexer which selects one analog signal from among analog signals from the lens position sensor 2, the vibration detection means 3, the zooming position sensor 4, the focus position sensor 5, etc. and outputs it. The reference numeral 7 designates an A/D converter which converts the analog signal from the multiplexer 6 into a digital signal. The reference numeral 8 denotes a microcomputer which comprises a construction as will be described later and carries out various calculation processes regarding the present embodiment. The reference numeral 9 designates a D/A converter which converts a digital signal output from the microcomputer 8 into an analog signal. The reference numeral 10 denotes a driver (amplifier) which amplifies the analog signal from the D/A converter 9. The reference numeral 11 designates an actuator which eccentrically drives the image blur compensation lens 1 in conformity with an output signal from the driver 10. The actuator 11 forms an element of anti-vibration means.

The reference numeral 12 denotes an I/O part which outputs a signal for controlling which analog signal should be selected in the multiplexer 6 by the output signal from the microcomputer 8, and checks up the state of other system. The reference numeral 13 designates the image pickup surface of the photo-taking system which corresponds to a location at which the surface of a film or an image pickup device such as a CCD lies. The image pickup surface 13 is fixed to the same lens barrel as the photo-taking system, and when vibration such as the vibration of hand is applied to the photo-taking system, the image on the image pickup surface 13 will become a blurred image unless the image is compensated for by the image blur compensation means.

In the present embodiment, the aforedescribed anti-vibration means, the vibration detection means 3, the zooming position sensor, the focus position sensor, etc. together constitute an element of the image blur compensation means.

Figure 2:
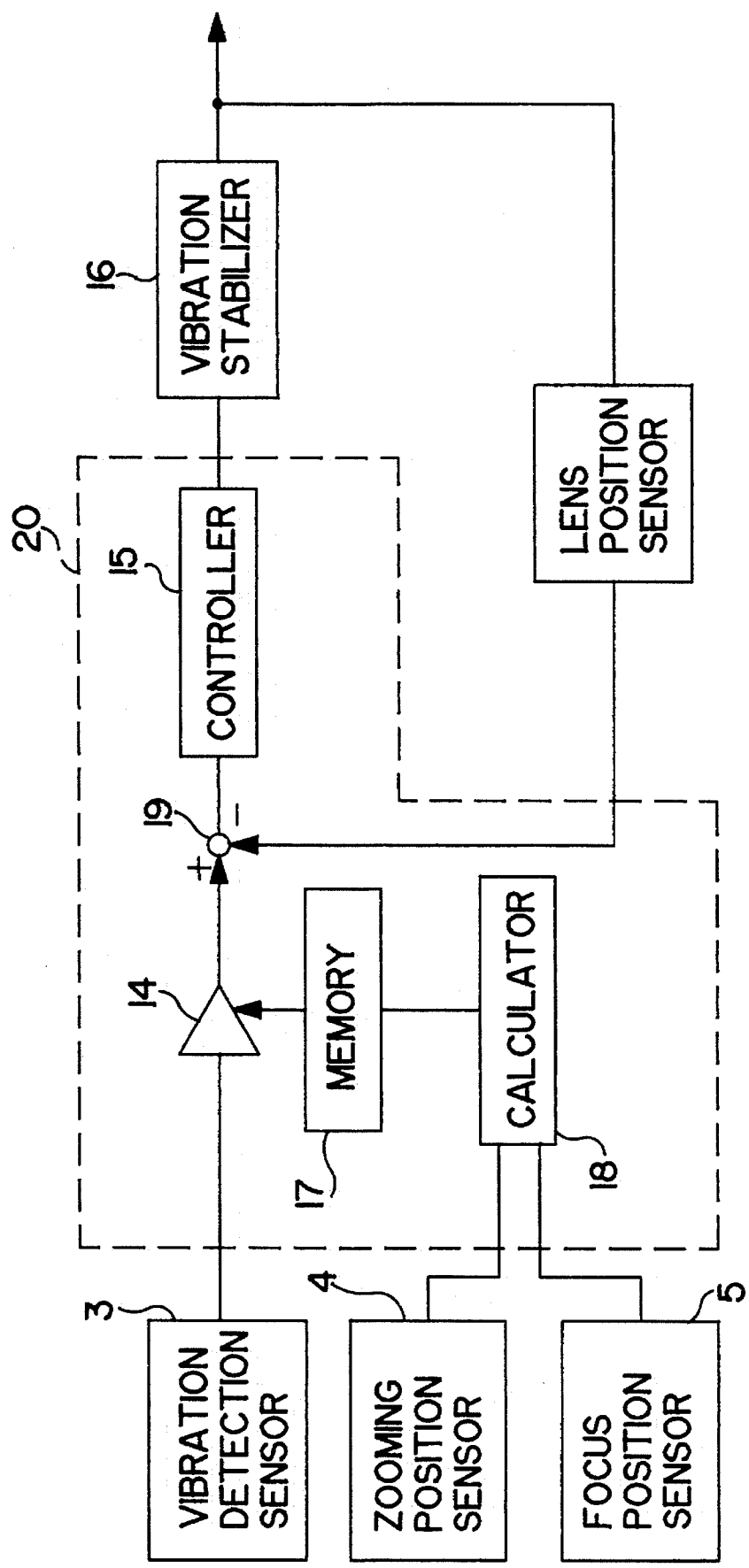
FIG. 2 is a block diagram of portions of FIG. 1.

FIG. 2 is a block diagram illustrating feedback control effected in the microcomputer 8 of FIG. 1 and the control of so-called degree of anti-vibration sensitiveness for varying the amount of compensation during the image blur compensation of the image blur compensation lens 1. In FIG. 2, the same elements as those in FIG. 1 are given the same reference numerals, and the multiplexer 6, the A/D converter 7, the D/A converter 9, the I/O part 12, etc. are omitted. In FIG. 2, the reference numeral 20 designates a part of the calculation process carried out in the microcomputer 8 of FIG. 1.

The reference numeral 14 denotes an amplifier which amplifies the signal from the vibration detection means 3. The reference numeral 15 designates a controller which keeps the feedback control stable. The reference numeral 16 denotes anti-vibration means comprised of the image blur compensation lens 1 and actuator 11 of FIG. 1. The reference numeral 17 designates a memory which varies the amplification factor of the amplifier 14. The reference numeral 18 denotes a calculator. The reference numeral 19 designates a differential device which effects the differential of the output signal of the amplifier 14 and the output signal of the lens position sensor 2.

Vibration such as the vibration of a hand applied to the photo-taking system in FIG. 1 is detected by the sensor (vibration detection means) 3, and a signal representative of the magnitude and direction of the displacement by the vibration is output from the sensor 3. Various types of sensors have recently been developed as the sensor 3, and a sensor which detects the angular displacement of vibration, a sensor which detects the angular velocity of vibration and a sensor which detects the angular acceleration of vibration are applicable as the sensor 3. Now, this sensor requires one level integration if it is one which outputs angular displacement and detects angular velocity, and requires two level integration if it is one which detects angular acceleration, and the sensor 3 also includes each integration element depending on the detection system thereof.

The analog output signal of this sensor 3, if selected by the multiplexer 6 on the basis of a control signal passed through the I/O part 12 by the command of the microcomputer 8, is sent to the A/D converter 7 and introduced into the microcomputer 8 as a digital signal of vibration by the vibration of hand or the like. The zooming position sensor 4 outputs the zooming position at which photographing is being attempted in the photo-taking system, i.e., an analog signal of focal length information, and this analog signal, like the analog output signal of the sensor 3, is introduced into the microcomputer 8.

The analog signal of focus distance information from the focus position sensor 5 is also similar. The analog signal output from the lens position sensor 2 is a signal representative of the position of the image blur compensation lens 1 and is likewise introduced into the microcomputer 8. The microcomputer 8 calculates from the above-mentioned four signals how the image blur compensation lens 1 should be moved relative to image blur. The amount of compensation calculated by the microcomputer 8 is output as a digital signal to the D/A converter 9. The D/A converter 9 converts the digital signal output from the microcomputer 8 into an analog signal and applies it as the amount of compensation to the driver 10. The output signal of the driver 10 eccentrically moves the image blur compensation lens 1 by the actuator 11 to compensate for the image blurred on the image pickup surface 13 on the basis of the signal detected by the sensor 3.

In the present embodiment, the direction of eccentric movement of the image blur compensation lens 1 and the direction of detection of the sensor 3 have been described with respect only to one axis, but the image blur compensation lens 1 is moved in a plane perpendicular to the optic axis of the photo-taking system and compensates for the image blur by two axes, and the respective constituents shown in FIG. 1 are provided for two axes. Of course, however, the zooming position sensor 4 and the focus position sensor 5 are common and the microcomputer 8 may be common if two axes are dealt with by time sharing or the like.

A method of calculating the amount of compensation of the image blur compensation lens 1 for compensating image blur, by the microcomputer 8, will now be described with reference to FIG. 2.

In FIG. 2, the angular displacement signal such as the vibration of hand from the sensor 3 is weighted by the amplifier 14 and is used as the target value of a feedback loop control system in the present embodiement. Also, the anti-vibration means 16 eccentrically moved to compensate for image blur has its amount of eccentric movement detected as an amount of control by the lens position sensor 2. The differential device 19 outputs the differential between said target value and said amount of control and makes it a control deviation. The control deviation is subjected to control such as phase compensation by the controller 15 and is applied as an amount of operation to the anti-vibration means 16.

That is, such an operation that the image blur compensation lens 1 is sufficiently eccentrically moved in the hand used and the control deviation becomes zero is applied to the target value signal by vibration such as the vibration of hand, whereby the image is controlled so as to be stable on the image pickup surface 13.

Next, the signal of focal length information from the zooming position sensor 4 and the signal of focus distance information from the focus position sensor 5 are introduced into the microcomputer 8 as described with reference to FIG. 1, and the degree of anti-vibration sensitiveness for compensating for image blur in accordance with each information is calculated in the calculator 18. The method of calculation of the degree of anti-vibration sensitiveness carried out in the calculator 18 and the weighting of the signals from the zooming position sensor 4 and the focus position sensor 5 are peculiar to individual photo-taking systems, and are determined each time. The degree of anti-vibration sensitiveness calculated in the calculator 18 is temporarily held in the memory 17. The amplification factor of the amplifier 14 is subjected to a variation by the degree of anti-vibration sensitiveness held in the memory 17 and the angular displacement signal from the sensor 3 is weighted. By the target value signal weighted by this degree of anti-vibration sensitiveness, the amount of operation is varied at the same time even when the degree of anti-vibration sensitiveness is varied by the focal length and the focus lens position, and the amount of eccentricity, for example, the amount of parallel eccentricity, of the image blur compensation lens 1 varies.

As described above, according to the present embodiment, the sensitivity of the hand vibration signal is varied by variations in the focal length of the photo-taking system and the focus lens position to thereby calculate a suitable amount of compensation and obtain a stable image on the image pickup surface.

Also, in the present embodiment, a magnification changing optical system has been described as an example, but where even in an optical system of single focal length, the focal length is greatly varied by focus distance, the present invention can likewise be applied.

Figure 3:
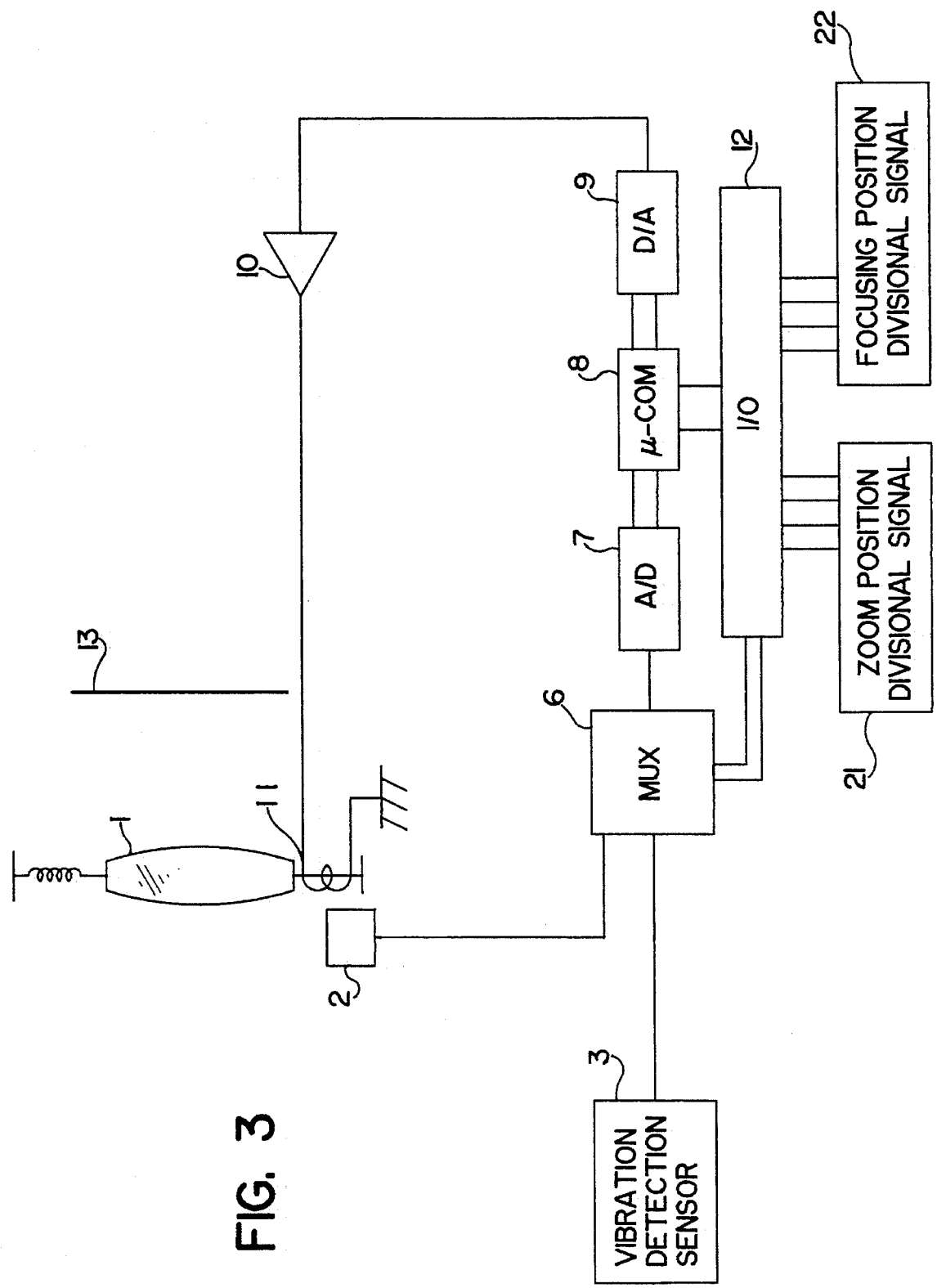

FIG. 3 is a block diagram of the essential portions of a second embodiment of the present invention. In FIG. 3, elements identical to those shown in FIG. 1 are given identical reference numerals.

In FIG. 3, the reference numeral 21 designates a zoom position divisional signal (a focal length divisional signal) which comprises a discrete signal obtained by dividing the zoom range of the photo-taking system into finite stages. The reference numeral 22 denotes a focus distance divisional signal (a focusing position divisional signal) which, like the zoom position divisional signal, comprises a discrete signal obtained by dividing the focus distance range into finite stages.

In FIG. 3, the zoom position information and focus distance information for calculating the degree of anti-vibration sensitiveness is divided finitely and therefore, the degree of anti-vibration sensitiveness is also divided finitely. The divisional signals as described above can be obtained by providing a plurality of switches in a zoom and focus moving portion.

A method of calculating the degree of anti-vibration sensitiveness in the construction of FIG. 3 will now be described with reference to FIG. 4.

Figures 4, 6:
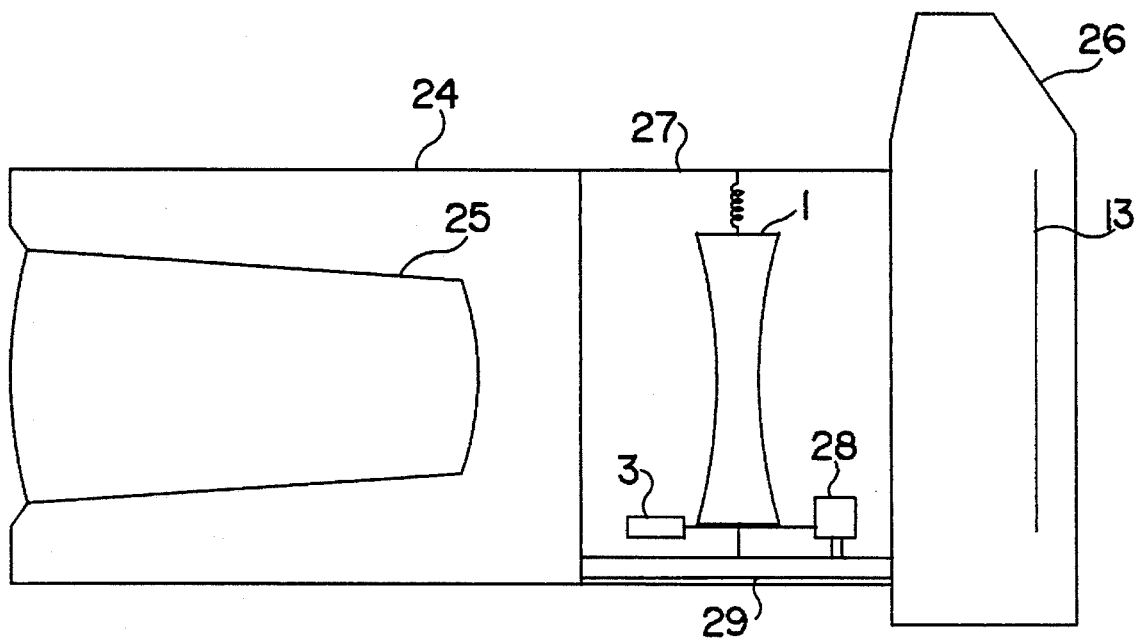
FIG. 4 is an illustration of the table of the degree of anti-vibration sensitiveness in FIG. 3.

In FIG. 4, the ordinate represents zoom position division and the abscissa represents focus distance division. In the present embodiment, the operations of the zoom position division and the focus distance position are each comprised of four switches and as a whole, division into 256 stages is possible. The table in FIG. 4 shows the degree of anti-vibration sensitiveness ($S_{00} \rightarrow S_{15.15}$) at each of the positions of the zoom position division ($Z_0 \rightarrow Z_{15}$) and the focus distance division ($A_0 \rightarrow A_{15}$), and is recorded as a value peculiar to the photo-taking system in an ROM (read only memory) in the microcomputer 8.

Now, where the zoom position of the photo-taking system is $Z_m$ and the focusing lens position is $A_n$, the degree of anti-vibration sensitiveness $S_{mn}$ is read out from the ROM by the microcomputer 8 and the amount of operation of the image blur compensation lens 1 is determined by the same method as that of the first embodiment. As described above, the amount to be operated, i.e., the degree of anti-vibration sensitiveness, is changed in conformity with the focal length and focus position of the photo-taking system to thereby obtain a stable image on the image pickup surface.

In the present embodiment, the degree of anti-vibration sensitiveness varies stepwise and therefore, in some cases, a slight error occurs to the degree of anti-vibration sensitiveness, but the then zoom division and focus division are done so that the error may be within an allowable value.

Also, the degree of anti-vibration sensitiveness is rarely varied linearly by the zoom position and focus distance and as regards each method of division, the number of divisions will become small if division is made densely in an area wherein the degree of anti-vibration sensitiveness varies greatly and division is made roughly in an area wherein the degree of anti-vibration sensitiveness varies small, and this is preferable.

In the above-described first and second embodiments, the amplifier 14 whose amplification factor is variable may alternatively be provided between the lens position sensor 2 and the differential device 19 to obtain just the same effect. In such case, the loop gain of the feedback control system also varies and therefore, the microcomputer need be designed with the loop gain taken into account.

Also, the two embodiments have been described with respect to digital control utilizing a microcomputer, but of course, the same effect will also be obtained in analog control.

Figure 5:
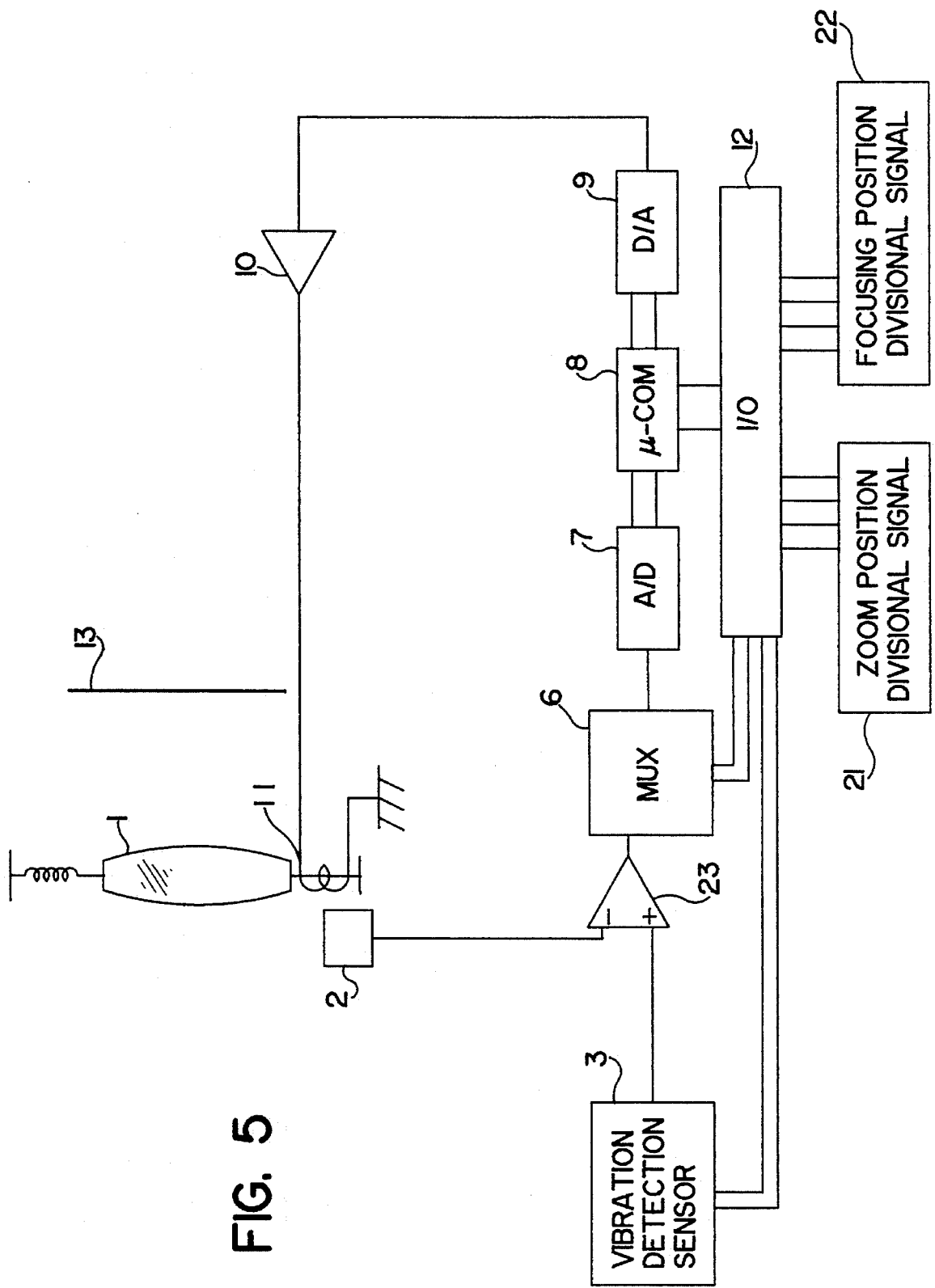
Figure 7:
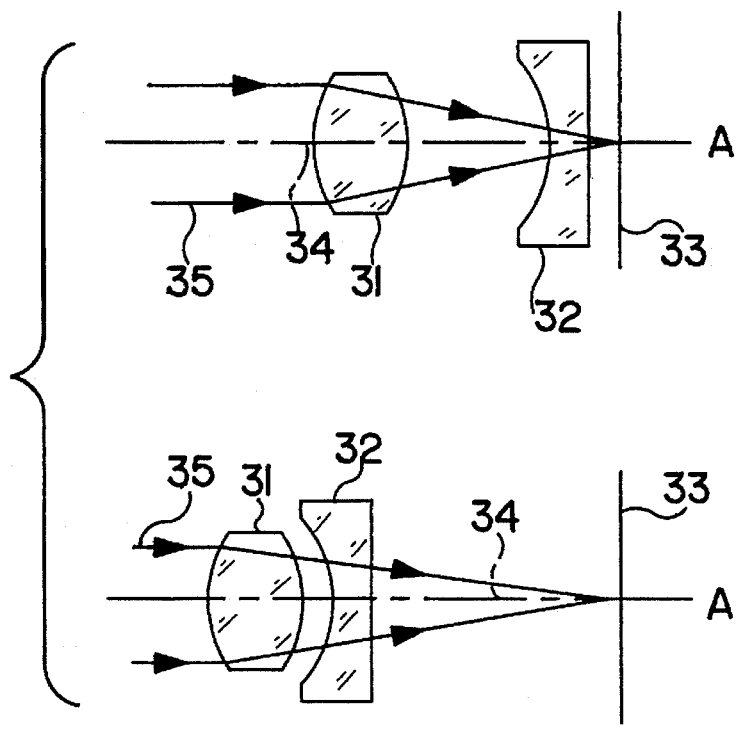
FIGS. 7, 8, 9A, and 9B are illustrations of a photographing apparatus having image blur compensation means according to the prior art.
Figure 8:
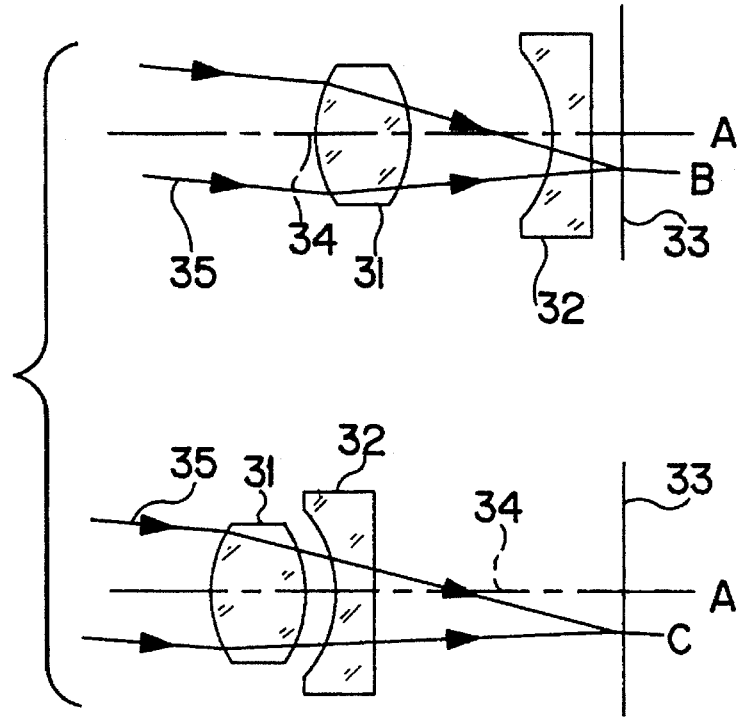
Figure 9A:
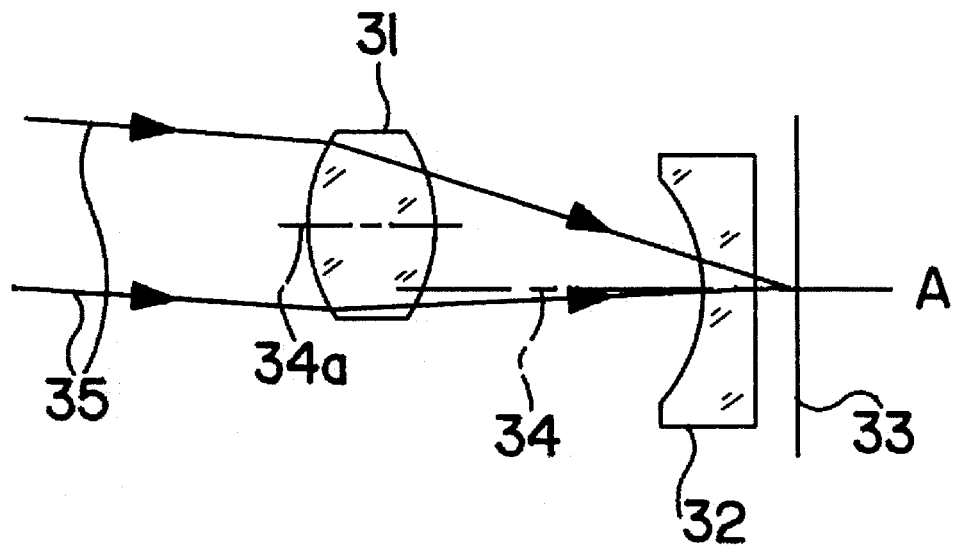
Figure 9B:
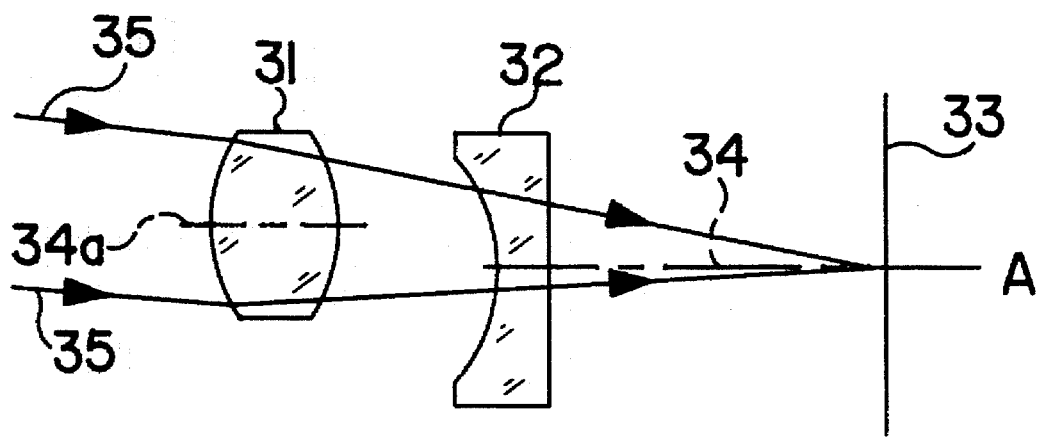

FIG. 5 is a block diagram of the essential portions of a third embodiment of the present invention.

In FIG. 5, elements identical to those shown in FIG. 3 are given identical reference numerals. In FIG. 5, the reference numeral 23 designates a differential amplifier which effects the differential amplification of the output signal from the sensor (vibration detection means) 3 and the output signal from the lens position sensor 2. This differential amplifier 23 performs the same function as the differential device 19 of FIG. 2, and outputs the control deviation of the feedback control system.

In the present embodiment, division information regarding the degree of anti-vibration sensitiveness calculated from the zoom position divisional signal 21 and the focus distance divisional signal 22 is output by the I/O part 12 so as to act on the sensor 3. The sensor 3 operates so that the output sensitivity thereof may be varied by this division information regarding the degree of anti-vibration sensitiveness. That is, the output signal of the sensor 3 is varied by the degree of anti-vibration sensitiveness, and when the focal length and focus distance of the photo-taking system are varied for the same reason as that set forth in the first embodiment, the amount to be operated is changed to thereby obtain a stable image on the image pickup surface.

Also, by the construction as described above, the differential in the control system is effected before digital conversion is effected, and the control deviation is A/D-converted to thereby obtain the effect that the dynamic range of the digital signal of the present feedback system can be secured greatly.

FIG. 6 is a schematic view of the essential portions of a fourth embodiment of the present invention.

In the present embodiment, it is intended in a still camera wherein a lens is interchangeable that image blur compensation means be provided between the interchangeable lens and the camera body and the image blur compensating function (anti-vibration function) be added to numerous kinds of interchangeable lenses. In FIG. 6, the reference numeral 24 designates a master lens as an interchangeable lens, the reference numeral 25 denotes a master lens optical system, the reference numeral 26 designates a camera body, and the reference numeral 27 denotes image blur compensation means having an extender having the anti-vibration function. The reference numeral 28 designates a controller for image blur compensation including a microcomputer, and the reference numeral 3 denotes a hand vibration sensor (vibration detection means). The reference numeral 29 designates a communication line which links the camera body 26 and the master lens 24 together. Along the communication line 29, all information usually comes and goes between the camera body 26 and the master lens 24. That is, the communication line 29 comprises a construction including not only an electrical signal line but also a mechanical connection.

In FIG. 6, the camera body 26 and the master lens 24 are usually used as an AF camera (auto-focus camera) and drive a focusing optical system forming a part of the master lens optical system 25 in the direction of the optic axis by the distance measurement data of a distance measuring sensor (not shown) in the camera body 26 through the communication line 29, thereby automatically effecting focusing.

In the present embodiment, when vibration such as the vibration of hand is applied to the camera, the hand vibration sensor 3 detects the direction and magnitude of the vibration and inputs them to the controller 28. Various calculations are effected by the controller 28 and the image blur compensation lens 1 is eccentrically moved to compensate for the blur of the image on the image pickup surface 13. Factors which determine the degree of anti-vibration sensitiveness in this case are the kind of the master lens 24 and the focal length and focus position information of the master lens optical system 25. The kind of the master lens 24 is such that at a point of time whereat the master lens 24 is mounted on the camera body 26 through the extender 27, the communication line 29 is utilized to effect communication between the camera body 26 and the master lens 24. The extender 27 monitors the communication and can know the kind of the master lens 24.

As regards the focal length information and the focus position information, the camera body 26, unless necessary, has these two kinds of information not sent to the master lens 24, and the extender 27 cannot monitor the communication to thereby obtain said two kinds of information. So, the extender 27 is designed to be able to temporarily disconnect the communication line 29 between the camera body 26 and the extender 27 and inquire of the master lens 24 about the focal distance information and the focus position information by the communication from the camera body 26.

However, when the camera body 26 and the master lens 24 are in a photographing condition or a preparatory condition for photographing, the amount of communication is great and if such a thing is done, it may become an error or wrong information may be sent to the camera body 26 or the master lens 24.

So, in the present embodiment, the degree of anti-vibration sensitiveness of the present system is calculated by the controller 28 in the following manner. The camera body 26 used in the present embodiment is an AF camera, and the master lens 24 comprises an AF lens. The camera body 26 delivers the amount of driving of a focusing lens (not shown) to the master lens 24 by the distance measurement data of the distance measuring sensor through the communication line 29. The camera body calculates the then amount of driving by the use of the focal length of the master lens optical system 25, i.e., the degree of AF sensitiveness determined by the zoom position and the current focusing lens position.

The degree of AF sensitiveness refers to the ratio of the amount of movement of the image plane to the unit amount of movement of the focusing lens on the optic axis.

This degree of AF sensitiveness is inherent to each of various lenses, and is recorded on an ROM (not shown) in the master lens 24, and the camera body 26 obtains this information from the master lens 24 through the communication line 29. The image blur compensation means 27 monitors the substance of this communication to thereby obtain the degree of AF sensitiveness, and obtain the current focal length information and focus distance information of the master lens 24 therefrom.

Next, the camera body 26 calculates the amount of driving of the focusing lens from the distance measurement data and the information of the degree of AF sensitiveness and transmits the data of the amount of driving to the master lens 24 through the communication line 29. So, the image blur compensation means 27 monitors this communication and applies correction to the previous focus distance information and thus, can obtain regular focus distance information, thereby calculating the final degree of anti-vibration sensitiveness.

According to the present embodiment, the degree of anti-vibration sensitiveness can also be accurately obtained in a system wherein image blur compensation means is provided discretely, and there can be obtained a stable image the blur of which when the camera vibrates has been well compensated for.

Figure 10:
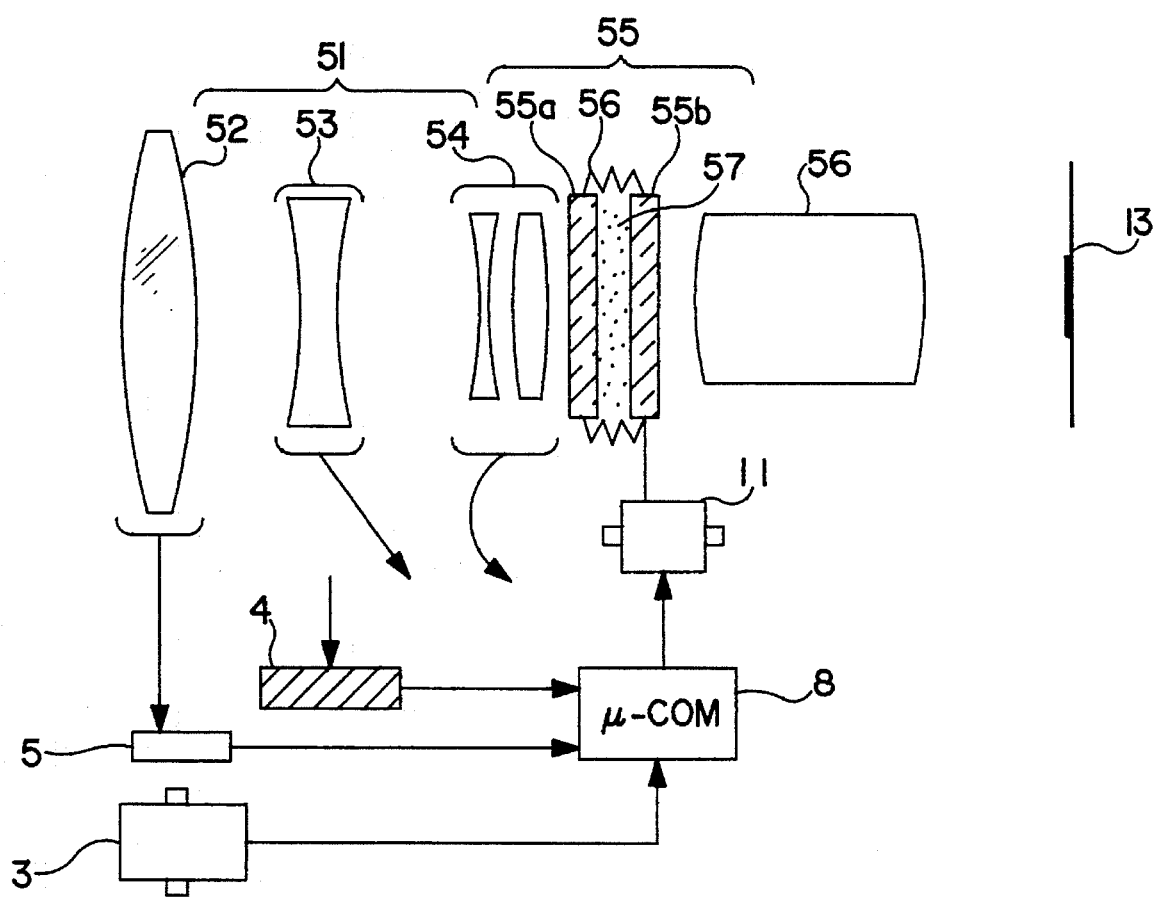

FIG. 10 is a schematic view of the essential portions of a fifth embodiment of the present invention.

In FIG. 10, elements identical to those shown in FIG. 1 are given identical reference numerals.

The present embodiment differs greatly from the first embodiment in that a variable vertical angle prism is employed as an element of the anti-vibration means for compensating for image blur and the variable vertical angle prism is disposed rearwardly of a magnification changing system, and is basically the same as the first embodiment in the other points.

In FIG. 10, the reference numeral 55 designates a variable vertical angle prisim comprising a transparent elastic material of high refractive index or inert liquid 57 enveloped and sandwiched between two transparent parallel plates 55a and 55b opposed to each other, the outer periphery thereof being elastically sealed by a sealing material 56 such as resin-like film, the transparent parallel plates 55a and 55b being pivotable about a pivot axis (not shown) in directions orthogonal to each other.

The construction and the principle of operation of such variable vertical angle prism 55 are described in detail in applicant's Japanese Laid-Open Patent Application No. 2-13901 and therefore need not be described herein.

In the present embodiment, a magnification changing system 51 is used as the photo-taking system. The magnification changing system 51 comprises a focusing lens unit 52, a magnification changing lens 53 and a correction lens 54 for correcting the image plane fluctuating with a magnification change. The reference numeral 54 designates a relay system.

In the present embodiment, a signal regarding the vibration of the camera detected by the vibration detection means 3, the focal length information from the zooming position sensor 4 and the focus distance information from the focus position sensor 5 are all input to the microcomputer 8, in which the degree of anti-vibration sensitiveness is found in the same manner as in the first embodiment, and on the basis of this, the vertical angle of the variable vertical angle prism 55 is varied by the actuator 11 to thereby compensate for image blur.

In each of the above-described embodiments, the optical members disclosed, for example, in Japanese Laid-Open Patent Application No. 61-223819 and Japanese Patent Publication No. 57-7414 are also applicable as the anti-vibration means.

According to the present invention, there can be achieved a photographing apparatus in which image blur compensation means having vibration detection means (a hand vibration sensor) for detecting the vibration when a camera vibrates and anti-vibration means for compensating image blur resulting from the vibration is provided in a portion of a photo-taking system and when the image blur is to be compensated for, the focal length information and focus distance information of the photo-taking system are used as previously described to thereby obtain an appropriate degree of anti-vibration sensitiveness, whereby highly accurate compensation for the image blur is made possible.

I claim:

1. A photo-taking system comprising:

photo-taking lens means for forming an image comprising a first lens unit movable along an optic axis thereof to vary a focal length thereof, a second lens unit movable along the optic axis thereof to effect focus adjustment, and an optical unit for compensating for a vibration of the image;

first and second detection means for detecting lens positions of said first and second lens units, respectively;

third detection means for detecting a vibration of said photo-taking lens means;

calculating means for calculating an amount of compensation of said optical unit on the basis of detection signals of said first, second, and third detection means; and position detection means for detecting a position of said optical unit, wherein said calculating means further calculates the amount of compensation of said optical unit on the basis of detection signals from said position detection means.

2. A photo-taking system according to claim 1, further comprising memory means for storing therein information corresponding to the lens positions of said first and second lens units and wherein said calculating means calculates the amount of compensation on the basis of the stored information and the detection signal of said third detection means.

3. A photo-taking system according to claim 1, wherein said optical unit is a lens unit having predetermined refractive power and is made eccentric relative to the optic axis of said photo-taking lens means on the basis of the information of said calculating means.

4. A photo-taking system according to claim 1, wherein said optical unit is a variable vertical angle prism whose vertical angle is varied on the basis of the amount of compensation calculated by said calculating means.

5. A photo-taking system comprising:

photo-taking lens means for forming an image comprising a compensating optical unit for compensating for image blur, a zoom lens unit for effecting a zooming operation, and a focusing lens unit for effecting a focusing operation;

vibration detection means for detecting vibration;

information detection means for detecting focal length information, which varies with a zooming operation of said zooming lens unit, and focus distance information, which varies with a focusing operation of said focusing lens unit;

calculating means for calculating an amount of compensation of said compensating optical unit in conformity with detection signals of said vibration detection means and said information detection means; and position detection means for detecting a position of said optical unit, wherein said calculating means further calculates the amount of compensation of said optical unit on the basis of detection signals from said position detection means.

6. A photo-taking system according to claim 5, further comprising memory means for storing therein certain information corresponding to the focal length information and the focus information and wherein said calculating means calculates said amount of compensation on the basis of the stored information and the detection signal of said vibration detection means.

7. A photo-taking system according to claim 5, wherein said optical unit is a lens unit having predetermined refractive power and is made eccentric relative to the optic axis of said photo-taking lens means on the basis of the amount of compensation calculated by said calculating means.

8. A photo-taking system according to claim 5, wherein said optical unit is a variable vertical angle prism whose vertical angle is varied on the basis of the amount of compensation calculated by said calculating means.

9. An image stabilizer device, comprising:

(a) objective lens means for forming an image, said lens means having an optical axis and comprising a first optical unit movable along the optical axis for focusing and a second optical unit movable along the optical axis for zooming;

(b) variable vertical angle prism means;

(c) first means for outputting a first signal representing a position of said first optical unit;

(d) second means for outputting a second signal representing a position of said second optical unit;

(e) third means for outputting a third signal representing a deviation in a position of the image formed by said objective lens means; and (f) calculating means for calculating a driving amount for driving said variable vertical angle prism means based on the first, second, and third signals.

10. An image stabilizer device, comprising:

(a) objective lens means for forming an image, said lens means having an optical axis and comprising a first optical unit movable along the optical axis, a second optical unit movable along the optical axis, and a third optical unit for stabilizing blur of the image;

(b) first detection means for detecting a position of said second optical unit;

(c) second detection means for detecting a position of said first optical unit;

(d) third detection means for detecting blur;

(e) driving means for driving said third optical unit in accordance with detection results of said first, second, and third detection means; and (f) position detection means for detecting a position of said third optical unit, wherein said driving means further drives said third optical unit on the basis of detection signals from said position detection means.

11. A photo-taking system according to claim 9, further comprising a position detection means for detecting a position of said variable apex angle prism means, wherein said calculating means further calculates the amount of compensation of said optical unit on the basis of detection signals from said position detection means.

12. An image stabilizing device, comprising:

(a) objective lens means for forming an image, said objective lens means having an optical axis and comprising a first optical unit movable along the optical axis, a second optical unit movable along the optical axis, and a third optical unit for stabilizing blur of the image;

(b) first detection means for detecting the position of said second optical unit;

(c) second detection means for detecting the position of said first optical unit;

(d) third detection means for detecting blur of the image;

(e) fourth detection means for detecting the condition of said third optical unit; and (f) driving means for driving said third optical unit in accordance with detection results of said first, second, third, and fourth detection means.

13. An image stabilizer device according to claim 12, wherein said first lens unit moves along said optical axis for performing a zooming operation.

14. An image stabilizer device according to claim 12, wherein said second lens unit moves along said optical axis for performing a focusing operation.

15. An image stabilizer device according to claim 12, wherein said third optical unit includes a variable apex angle prism.

16. An image stabilizer apparatus comprising:

photo-taking means for forming an image, comprising a first lens unit movable along an optical axis thereof to vary a focal length thereof, a second lens unit movable along the optical axis thereof to effect a focus adjustment, and an optical unit for compensating for a vibration of the image;

first detection means for detecting information regarding focus distance information of said photo-taking means;

second detection means for detecting blur of the image;

third detection means for detecting an amount of compensation of said optical unit; and driving means for driving said optical unit in accordance with detection results of said first, second, and third detection means.

17. An image stabilizer apparatus according to claim 16, wherein said first detection means detects the position of said first lens unit.

18. An image stabilizer apparatus according to claim 16, wherein said apparatus further comprises fourth detection means for detecting the position of said second lens unit, and wherein said driving means also drives said optical unit based on a result of detection of said fourth detection means.

* * * * *

UNITED STATES PATENT AND TRADEMARK OFFICE
CERTIFICATE OF CORRECTION

PATENT NO. : 5,479,236
DATED : December 26, 1995
INVENTOR(S) : HIDEKI TANAKA

It is certified that error appears in the above-indentified patent and that said Letters Patent is hereby corrected as shown below:

COLUMN 3

Line 2, "sensitiveness" should read --sensitivity--.
Line 8, "sensitiveness" should read --sensitivity--.
Line 36, "sensitiveness" should read --sensitivity--.

COLUMN 5

Line 58, "embodiement." should read --embodiment.--.

COLUMN 9

Line 62, "prisim" should read --prism--.

COLUMN 12

Line 22, "A photo-taking system" should read --An image stabilizer device--.

Signed and Sealed this

Eighteenth Day of June, 1996

*Attest:*

BRUCE LEHMAN

*Attesting Officer*  *Commissioner of Patents and Trademarks*